United States Patent [19]

Katsuoka et al.

[11] Patent Number: 4,926,357

[45] Date of Patent: May 15, 1990

[54] APPARATUS FOR MEASURING DIAMETER OF CRYSTAL

[75] Inventors: Nobuo Katsuoka, Takasaki; Yoshihiro Hirano, Annaka; Tomohiro Kakegawa, Takasaki, all of Japan

[73] Assignee: Shin-Etsu Handotai Company, Limited, Tokyo, Japan

[21] Appl. No.: 249,004

[22] Filed: Sep. 23, 1988

[30] Foreign Application Priority Data

Sep. 25, 1987 [JP] Japan .................... 62-240361

[51] Int. Cl.⁵ .................. C30B 15/28; G06F 15/46
[52] U.S. Cl. .................... 364/560; 364/562; 364/564; 356/30; 356/384; 156/601
[58] Field of Search .............. 364/560, 562–564; 250/560; 156/601; 356/30, 384, 387

[56] References Cited

U.S. PATENT DOCUMENTS

| | | | |
|---|---|---|---|
| 4,242,589 | 12/1980 | Sachs | 356/387 |
| 4,336,597 | 6/1982 | Okubo et al. | 364/560 |
| 4,350,557 | 9/1982 | Scholl et al. | 156/601 |
| 4,565,598 | 1/1986 | Seymour | 156/601 |
| 4,710,258 | 12/1987 | Latka | 156/601 |
| 4,794,263 | 12/1988 | Katsuoka et al. | 250/560 |

Primary Examiner—Parshotam S. Lall
Assistant Examiner—Brian M. Mattson
Attorney, Agent, or Firm—Browdy and Neimark

[57] ABSTRACT

An apparatus is used in the production of a monocrystalline rod by Czochralski method and is adapted for measuring the diameter of the monocrystalline rod at the melt surface of the melt by processing image signal derived from an image sensor. The measurement of the diameter is conducted by determining the diameter of the monocrystalline rod at the melt surface by processing the output signal from the image sensor, and multiplying the rod image diameter with a function of the difference between the initial melt surface level and a melt surface corrected in accordance with a change in the temperature in the apparatus chamber or a change in the level of the electrical power supplied to a heater for heating a crucible.

10 Claims, 5 Drawing Sheets

APPARATUS FOR MEASURING DIAMETER OF CRYSTAL

BACKGROUND OF THE INVENTION

1. Field of the Invention

The present invention broadly relates to the production of a monocrystalline rod by Czochralski method and, more particularly, to an apparatus which is capable of measuring, by processing image signal from an image sensor, the diameter of a monocrystalline at the surface of a melt during growth of the crystal by Czochralski method.

2. Description of the Prior Art

In general, a silicon monocrystalline rod is ground until its diameter is reduced to the final size before the rod is sliced into wafers. Although the grinding margin is preferably small, there is a practical limit in the reduction of the grinding margin due to various reasons.

In recent years, a method known as Czochralski method is finding spreading use in the production of monocrystalline rod. Silicon monocrystalline rods produced by this method generally have large diameters, say 158 mm or so and, therefore, the volume of the rod to be removed by grinding with respect to the grinding margin is correspondingly large, with the result that the production cost is raised uneconomically. It would be worth saying that, when the monocrystalline rod has a length of 600 mm and a diameter of 158 mm, the amount to be removed by grinding is as large as 298 $cm^3$ even when the grinding margin is as small as 1 mm in terms of diameter. Thus, reduction in the grinding margin of the monocrystalline rod is a matter of great significance, considering the current increasing demand for lower production cost.

The grinding margin would be reduced appreciably if the irregularity of the rod diameter could be reduced by attaining higher response and stability in the diameter control operation. A higher degree of accuracy in the measurement of the monocrystalline rod diameter also would contribute to the reduction in the grinding margin.

SUMMARY OF THE INVENTION

Accordingly, an object of the present invention is to provide an apparatus for measuring the diameter of a monocrystalline rod, which is capable of measuring, with a high degree of accuracy, the diameter of a monocrystalline rod which is being produced by a monocrystalline rod production apparatus.

To this end, according to the present invention, there is provided an apparatus for measuring diameter of a monocrystalline rod which is being produced by Czochralski method, comprising: image sensor means secured to the wall of a chamber which accommodates a crucible and capable of forming an image of the monocrystalline rod; initial melt surface level measuring means designed for measuring the initial level of the melt surface of a melt in the crucible; instant melt surface level measuring means designed for determining the instant melt surface level during growth of the monocrystalline rod, by making use of the amount of rise of the monocrystalline rod, size of the crucible and the vertical displacement of the crucible; temperature sensor means capable of detecting the temperature in the chamber; correction means for correcting the melt surface level during growth of monocrystalline rod in accordance with a change in the temperature of the chamber detected by the temperature sensor means; and diameter measuring means designed for determining the diameter of image of the monocrystalline rod at the melt surface by arithmetically processing the output signal from the image sensor and for determining the diameter of the actual monocrystalline rod at the melt surface from the difference between the corrected melt surface level and the initial melt surface level.

In another aspect of the invention, the apparatus for measuring the diameter of a monocrystalline rod is devoid of the temperature sensor, and the correction of the diameter value is conducted by making use of the value of the electrical power supplied to a heater around the crucible, in place of the temperature of the chamber.

Figures 5, 6:
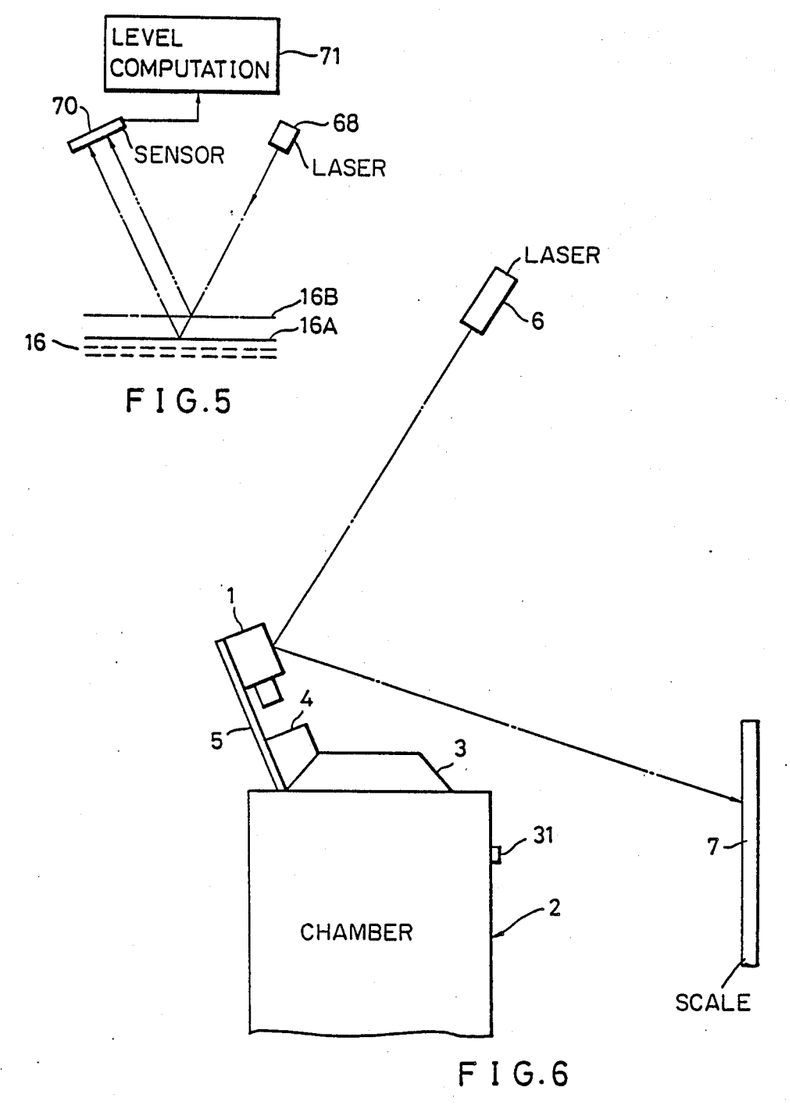
FIG. 5 is a schematic illustration of an initial melt surface level detection device incorporated in a third embodiment of the present invention.
FIG. 6 is an illustration of a method for measuring heightwise displacement of an image sensor attached to a chamber caused by a change in the temperature of the chamber, explanatory of the principle of the present invention.

Referring to FIG. 6, in general, an industrial television camera 1 for measuring the monocrystalline rod is secured to the wall of a chamber 2 accommodating a crucible, in such a manner that the optical axis of the camera directs a window 4 which is provided on a neck portion 3 of the chamber 2.

The control of the monocrystalline rod diameter is usually conducted by controlling the electrical power supply to the heater which heats the melt in the crucible. In most cases, the electrical power is varied within a range of, for example, 70 kW to 90 kW. The variation in the electrical power supply causes a change in the heat input to cause a thermal expansion or contraction of the apparatus, with the result that the crucible and the shaft supporting the crucible are axially expanded or contracted. In consequence, the distance L between the industrial television camera 1 and the melt surface is significantly changed during the growth of the monocrystalline rod. It would be possible to compensate for this change in the distance L by arithmetically computing the amount of thermal expansion or contraction, but such computation cannot easily be carried out because different portions of the chamber 2 exhibit different temperature levels.

Figure 7:
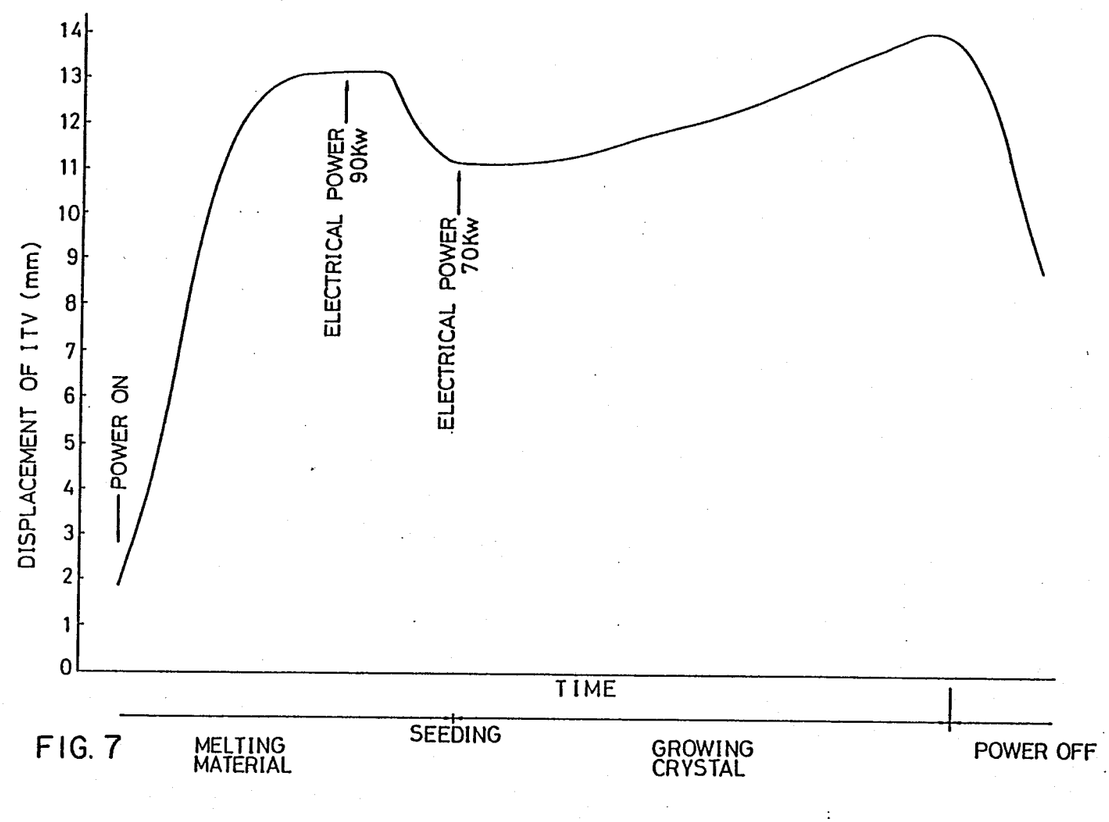
FIG. 7 is an illustration of the heightwise displacement of the chamber in relation to time, as measured by the measuring method illustrated in FIG. 6 and also explaining the principle of the present invention.

An attempt was made in which a laser beam from a laser 6 is applied to an aluminum foil adhered to the outer peripheral surface of the industrial television camera 1, and the beam reflected by the aluminum foil was made to impinge upon a displacement scale 7 so as to form a beam spot on the scale 7. FIG. 7 shows the result of measurement of the spot on the scale 7. From FIG. 7, it will be understood that the distance between the industrial television camera 1 and the melt surface of the melt varies within the range of 2 mm even if the melt surface of the melt is kept unchanged during the growth of the crystal. This change in the distance causes an error in the measurement of the crystal diameter on the order of 0.3 to 0.5 mm which is too large to neglect. The amount of change in the distance between the industrial television camera 1 and the melt surface of the melt can be computed with a high degree of accuracy by making use of an approximate function employing a suitable parameter such as the value of the electrical power supplied to the melt heating heater or the representative temperature of the chamber 2 which is detected by a temperature detector 31 mounted on a suitable portion of the chamber 2.

The present invention, based upon the above-described discovery, offers an advantage in that the grinding margin, i.e. the amount of the crystal material to be removed by grinding before slicing into wafers, can be significantly reduced by virtue of the improved measuring accuracy provided by the measuring apparatus of the invention, thus contributing to a reduction in the cost of production of the monocrystalline rod.

The above and other objects, features and advantages of the present invention will become clear from the following description of the preferred embodiment taken in conjunction with the accompanying drawings.

DESCRIPTION OF THE PREFERRED EMBODIMENTS

Figure 1:
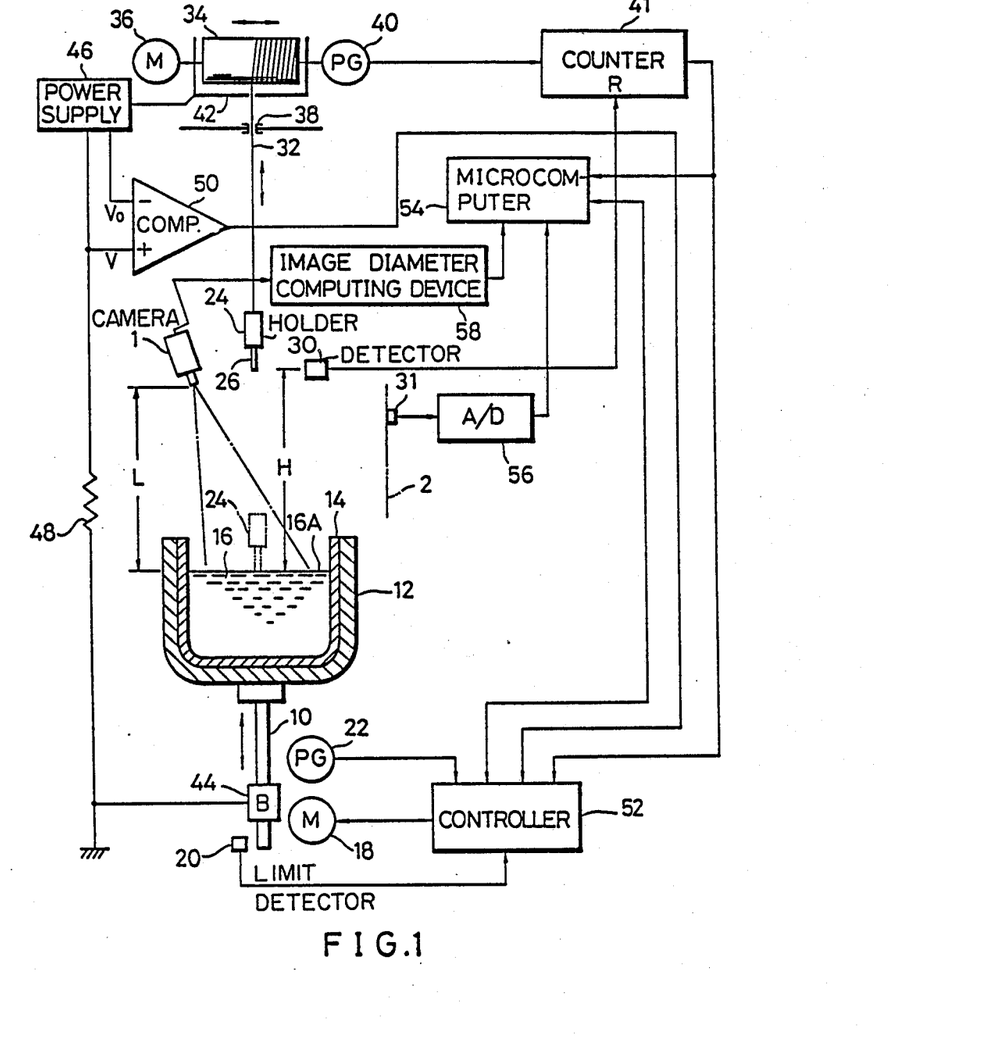
FIG. 1 is a schematic illustration of the whole of a crystalline rod diameter measuring apparatus in accordance with a first embodiment of the present invention.

Referring to FIG. 1, a first embodiment of the crystal rod diameter measuring apparatus in accordance with the present invention has a graphite crucible 12 carried by the upper end of a crucible drive shaft 10. The graphite crucible 12 receives a quartz cruicible 14 which is charged with a predetermined amount of polysilicon. In operation, electrical power is supplied to a heater (not shown) surrounding the graphite crucible 12 so that the polysilicon is molten to form a melt which is denoted by 16. The crucible drive shaft 10 is adapted to be moved up and down by the operation of an electric motor 18 so as to keep the melt surface A of the melt 16 at a predetermined level. The heightwise or vertical position of the crucible drive shaft 10 is detected by a lower limit detector 20 and a pulse generator 22 which is connected to the output shaft of the electric motor 18 and capable of issuing pulses of a number proportional to the amount of displacement of the crucible drive shaft 10.

In operation, a seed crystal 26 held by a seed holder 24 is lowered into contact with the melt 16 and is then raised so that a silicon monocrystalline rod is formed. The diameter D of the silicon monocrystalline rod at the melt surface of the melt 16 is measured by suitably processing an image signal which is derived from an industrial television camera 1 which is fixed to the wall of a chamber 2 as shown in FIG. 6.

The accuracy of measurement of the monocrystalline rod diameter D, however, is impaired due to a change in the distance L between the industrial television camera 1 and the melt surface 16A which inevitably takes place during the growth of the crystal.

This problem can be overcome by the first embodiment of the present invention as will be understood from the following description. Namely, in the first embodiment of the invention, the distance H between the melt surface 16A and a reference position detector 30 disposed above the melt surface 16A is measured. Then, the crucible drive shaft 10 is actuated up and down so as to keep the distance L in conformity with an initial set value $L_0$. Meanwhile, the temperature T of the chamber 2 is detected by a temperature detector 31 which is secured to the wall of the chamber 2. After the seeding, i.e. once the growth of the monocrystalline rod is initiated, the diameter of the monocrystalline rod is initiated, the diameter of the monocrystalline rod D is measured accurately by making use of a value $L_T$ which is obtained by correcting the measured distance L in accordance with the detected temperature T. This operation will be more fully described hereafter with specific reference to FIGS. 1 and 2.

Referring first to FIG. 1, the seed holder 24 is connected at its upper end to one end of a wire 32, the other end of which is fixed to a drum 34 after making one turn in a single layer along a spiral groove formed in the outer peripheral surface of the drum 34. The drum 34 is adapted to be rotated by a motor 36. The motor 36 has a threaded output shaft (not shown) so that the drum 34 also is axially displaceable by the operation of the motor 36. With this arrangement, the wire 32 unwound from the drum 34 or wound onto the same can always be aligned with a guide 38 so that the wire 32 suspends vertically through the guide 38 without being deflected in the horizontal direction. Since each turn of the wire 32 on the drum 34 has a constant length, the amount or length of the wire 32 unwound from or wound onto the drum 34 can be accurately measured by measuring the number or angle of rotation of the drum 34.

A pulse generator 40 has a shaft which is connected to the shaft of the drum 34, so that the pulse generator 40 issues pulses of a number which is proportional to the amount or angle of rotation of the drum 34. The pulses, as well as a signal which represents the direction of rotation of the drum 34, are input, respectively, to a pulse input terminal and an up/down control terminal of the counter 41, so that the counter 41 conducts up-counting and down-counting as the seed crystal 26 is moved downward and upward, respectively. The content of the counter 41 is cleared to reset the counter 41 when the seed crystal 26 has been moved to a position where the lower end of the seed crystal 26 is detected by the reference position detector 30.

Figure 2:
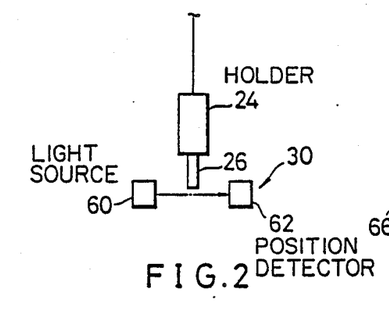
FIG. 2 is a schematic illustration of a reference position detector incorporated in the first embodiment.

FIG. 2 shows an example of the reference position detector 30 used in the first embodiment. This reference position detector 30 has a light-emitting element 60 and a light-receiving element 62. The lowering of the seed crystal 26 to the reference position is detected because the lower end of the seed crystal arriving at the reference position interrupts the light from the light-emitting element 60 to prevent the light from reaching the light-receiving element. The light-emitting element 60 and the light-receiving element 62 may be provided in a shutter which is disposed above the chamber 2. When the lower end of the seed crystal 26 is detected, the operation of the motor 36 is temporarily stopped, and the motor 36 is re-started to commence the lowering of the seed crystal again after the shutter is opened.

Electrical connections are established without necessitating any specific connecting measure, between the seed crystal 26 and a base 42 in support of the drum 34 and between the melt 16 and the bearing 44 of the crucible drive shaft 10. One output terminal of a D.C. power supply 46 is connected to the base 42, while the other output terminal of the D.C. power supply 46 is connected to the bearing 44 through the resistor 48. Therefore, when the wire 32 has been unwound and paid off to being the seed crystal 26 into contact with the melt 16, a D.C. circuit is closed so that electric current from the D.C. power supply 46 flows through the circuit to generate a voltage V across the resistor 48. The voltage V is input to a comparator 50 which compares this voltage V with a reference voltage $V_0$ supplied from the D.C. power supply 46. The comparator 50 produces an output signal of a high (H) level when the voltage V across the resistor 48 is higher than the reference voltage $V_0$.

Figure 4:
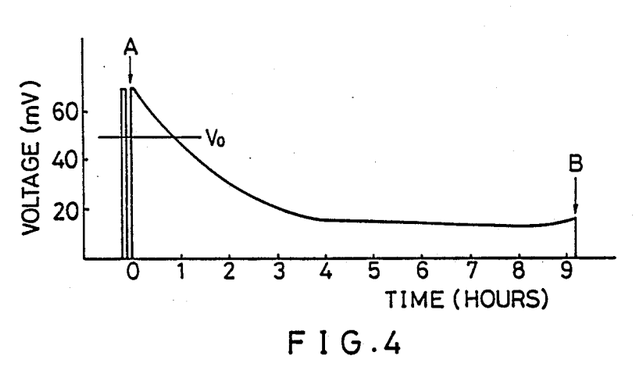
FIG. 4 is a diagram showing a level of voltage across a resistor 48 in relation to time during the production of a monocrystalline rod.

FIG. 4 shows the results of measurement of the voltage across the resistor 48 as measured when a D.C. power supply having an output voltage of 12 V was used as the D.C. power supply 46.

A point indicated at A corresponds to a moment or instance at which the seed crystal 26 is brought into contact with the melt 16, while a point indicated at B corresponds to a moment at which the tail of the product monocrystalline rod takes off the melt 16.

The output signal from the comparator 50 is delivered to a controller 52. When the seed crystal 26 is brought into contact with the melt 16, the condition of $V=V_0$ is met so that the comparator 50 delivers a signal of H level to the controller 52 thereby enabling the controller to reverse the motor 36 so as to slightly wind the wire 32 back onto the drum 34, whereby the seed crystal 26 is slightly spaced apart from the melt 16. The controller 52 also reads the content of the counter 41 when the condition of $V=V_0$ is met, and the read content is compared with a set value stored in the controller 52. The controller 52 then operates to drive the motor 18 while counting the pulses from the pulse generator 22, so as to move the crucible drive shaft 10 up and down in such a manner as to maintain the distance L between the industrial television camera 1 and the melt surface 16A in conformity with the set value $L_0$. The distance between the drum 34 and the melt surface 16A is about 3 meters or so, while the distances H and L are roughly 1 meter. It is therefore possible to measure the distance H with an error which is as small as ⅓ the error which is experienced when the reference position detector is disposed in the vicinity of the guide 38.

Subsequently, the seed crystal 26 is lowered again into contact with the melt 16 at the moment A shown in FIG. 4 and is then raised to start the growth of the silicon monocrystalline rod. During raising of the seed crystal 26, the crucible drive shaft 10 also is raised in such a manner that the melt surface 16A is held at a level which is predetermined in relation to the position of the heater in such a manner as to allow the growth of the crystal having a high quality.

Figure 8:
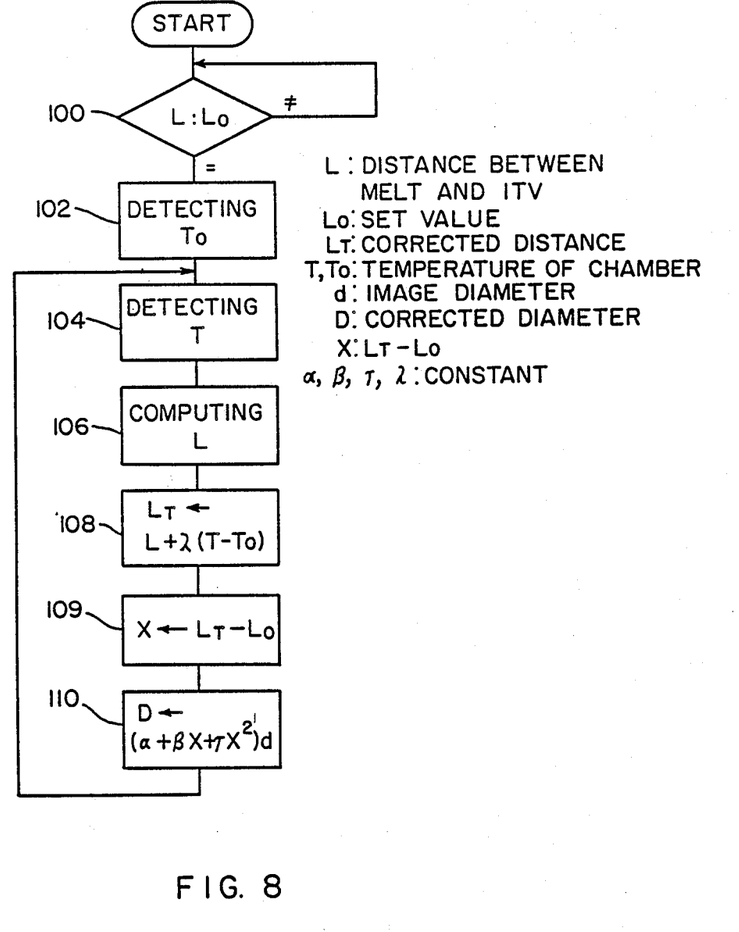
FIG. 8 is a flowchart of the mathematical functions and control operations performed by the apparatus.

The position or level of the melt surface 16A during growth of the monocrystalline is computed by a microcomputer 54 (step 106 on FIG. 8). More specifically, the microcomputer 54 receives data from an image diameter computing device 58 which processes the output from the counter 41 and the output from the industrial television camera 1 so as to output a value representing the diameter of the monocrystalline rod as measured at the melt surface 16A. Upon receipt of the data, the microcomputer 54 computes decrement in the amount of the melt 16 by conducting time-integration of the product of the cross-sectional area of the monocrystalline rod and the speed of rise of the crystalline rod with respect to the melt surface 16A and computes the distance L after the dipping of the seed crystal by making use of the distance $L_0$ and the crucible drive shaft 10.

As explained before, the distance L also varies by thermal expansion or contraction of the chamber 2, crucibles 12, 14 and the crucible drive shaft 10 attributable to a change in the temperatures of these members as a result of a change in the electrical power supplied to the heater (not shown) which heats the melt 16. The following operation, therefore, is executed to compensate for the change in the distance L caused by a change in the level of the electrical power.

When the distance L between the melt surface 16A and the industrial television camera 1 has been set to the command distance $L_0$ as described before (step 100 FIG. 8), the microcomputer 54 reads the temperature of the chamber $T_0$ by means of the temperature detector 31 through an analog-to-digital (A/D) converter 56 (step 102 on FIG. 8). The chamber temperature T is thereafter measured periodically (step 104 on FIG. 8). The compensation for the change in the distance L caused by the temperature change is then executed by computing the following approximate function employing the thus measured values of the chamber temperature T (step 108 on FIG. 8).

$$L_T = L + \gamma(T - T_0) \quad (1)$$

where, $L_T$ represents the distance after the correction, while $\gamma$ represents the thermal expansion coefficient which generally ranges between 0.2 mm/°C. and 0.5 mm/°C. Preferably, the values of the thermal expansion coefficient are varied in accordance with the change in the temperature T of the chamber.

Using the displacement X which is given as $X = L_T - L_0$ (step 109 on FIG. 8), the microcomputer 54 computes the correct monocrystalline rod diameter D at the melt surface (step 110 on FIG. 8) in a manner which will be explained hereafter.

The image diameter computing device 58 delivers to the microcomputer 54 data d concerning the diameter of the monocrystalline rod. The microcomputer, upon receipt of the data d, computes the correct monocrystalline rod diameter D by the following approximate function:

$$D = (\alpha + \beta X + \gamma X^2)d \quad (2)$$

where, $\alpha$, $\beta$ and $\gamma$ are constants.

It is also to be noted that the displacement X is much smaller than the distance $L_T$ so that the condition of $X/L_T << 1$ is met. The values of the constants $\alpha$, $\beta$ and $\gamma$ can be theoretically calculated but they may be determined through experiments.

By virtue of the compensation for the change in the distance L attributable to a temperature change, a reduction in the error of measurement of the diameter D is attainable in an amount which is as large as 0.4 to 0.5 mm. The magnitude of the measurement error varies depending on various factors such as the ratio $D/L_0$, size of he chamber 2, and the amount of change in the temperature of the chamber 2 caused by a change in the electrical power supplied to the melt heating heater. There also exist other factors which affect the accuracy of measurement. It is possible to reduce the error in an amount which equals or exceeds 1 mm, by taking suitable measures for eliminating the unfavorable effects produced by these factors, together with the described process performed by the apparatus of the present invention. Thus, the present invention contributes to a remarkable reduction in the measuring error in an amount which is 1 mm or greater.

Figure 3:
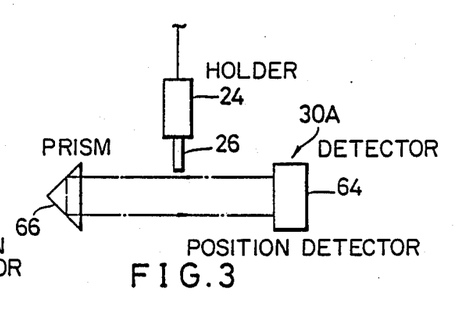
FIG. 3 is a schematic illustration of another example of the reference position detector incorporated in a second embodiment of the present invention.

A second embodiment of the measuring apparatus in accordance with the present invention will be described with reference to FIG. 3. The second embodiment features the use of another type of reference position detector denoted by 30A in FIG. 3. This reference position detector 30A includes a light emitting/receving element 64 and a rectangular prism 66. The light from the light emitting/receiving element 64 is reflected twice in the rectangular prism 66 so as to be turned through 180° and is received by the same element 64. When the seed crystal has reached the reference position, one of the paths of the light beams between the element 64 and the rectangular prism 66 is interrupted by the lower end of the seed crystal 26, whereby the arrival of the seed crystal at the reference position is detected by the reference position detector 30A. Other portions of the second embodiment are materially the same as those of the first embodiment.

A third embodiment of the present invention will be described hereinunder with reference to FIG. 5.

The third embodiment employs a different arrangement for measuring the initial position of the melt surface from that used in the first embodiment. More specifically, the third embodiment employs a laser 68 and an image sensor 70 which are directed towards the melt 16 so that the position of the spot formed on the image sensor 70 by the reflected laser beam varies as the melt surface position is changed between the levels indicated at 16A and 16B, and the position of the melt surface can be computed from this position of the spot. Other portions are materially the same as those in the first embodiment.

Although the invention has been described through specific terms, it is to be understood that the described embodiments are only illustrative and are not intended for limiting the scope of the invention. For instance, the wire 32 used in the first embodiment may be substituted by a shaft. It is also possible to use an A.C. power supply in place of the D.C. power supply used in the described embodiments.

It is also possible to use, in place of the measured temperature of the chamber, the level of the electrical power supplied to the heater for heating the melt in the crucible, as the factor for effecting compensation for the change in the distance L. In such a modification, needless to say, the temperature values $T_0$ and $T$ appearing in the formula (1) mentioned before are substituted by values of the electrical power supplied at the respective instants.

It will also be clear to those skilled in the art that the present invention can be applied to the production of various types of apparatus for producing monocrystalline rod of various substance by Czochralski method, although production of silicon monocrystalline rod has been specifically described by way of example.

Other changes and modifications are possible without departing from the scope of the invention which is limited solely by the appended claims.

What is claimed is:

1. An apparatus for measuring a diameter of a monocrystalline rod which is pulled up and grown from a melt in a crucible by Czochralski method, comprising:
   means for imaging a growing part of the monocrystalline rod and outputting a video signal, said means is mounted on a chamber in which the monocrystalline rod is grown;
   means for determining diameter "d" of said monocrystalline rod at a melt surface with said video signal;
   means for measuring an initial melt surface level;
   means for computing an instant melt surface level with data of said initial melt surface level, growing volume of said monocrystalline rod, size of said crucible and a vertical displacement of said crucible;
   means for detecting a temperature of said chamber;
   means for correcting said instant melt surface level with the detected temperature; and
   means for correcting said diameter "d" with said corrected instant melt surface level.

2. The apparatus according to claim 1, wherein said means for measuring said initial melt surface level comprises:
   a pulse generator for outputting pulses proportional to rotatory displacement of a drum on which is wound a wire for pulling up said monocrystalline rod;
   a sensor for outputting a signal when a seed crystal connected to one end of said wire passes a predetermined level;
   a counter for counting said pulses from said pulse generator, said counter being reset by said detection signal from said sensor;
   a power supply for applying a voltage between said drum and said crucible; and
   means for detecting contact of said seed crystal with said melt by detecting variation of electric current flowing between said drum and said crucible.

3. The apparatus according to claim 2 wherein said means for detecting contact of said seed crystal with said melt comprises:
   connecting lines for conducting an electrical current between said drum and said crucible through said power supply;
   a resistor connected in series with said connecting lines; and
   a comparator for comparing a voltage between both ends of said resistor and a reference voltage and for detecting the variation of electric current flowing between said drum and said crucible.

4. The apparatus according to claim 1, wherein said means for measuring said initial melt surface level comprises:
   a laser for applying a laser beam on said melt surface;
   an image sensor for receiving a portion of said laser beam reflected by said melt surface; and
   means for computing said initial melt surface level as a function of a position of a beam spot formed on said image sensor.

5. The apparatus according to claim 1, wherein said means for correcting said diameter "d" comprises multiplying said diameter "d" with a function of the difference between said corrected instant melt surface level and said initial melt surface level.

6. The apparatus for measuring a diameter of a monocrystalline rod which is pulled up and grown from a melt in a crucible by Czochralski method, comprising:

means for imaging a growing part of the monocrystalline rod and said means for imaging having an output video signal, wherein said means for imaging is mounted on a chamber in which the monocrystalline rod is grown;

means for determining a diameter "d" of said monocrystalline rod at a melt surface with said video signal;

means for measuring an initial melt surface level;

means for computing an instant melt surface level with data of said initial melt surface level, growing volume of said monocrystalline rod, size of said crucible and a vertical displacement of said crucible;

means for heating said melt by supplying an electric power;

means for correcting said instant melt surface level with said electric power supplied; and means for correcting said diameter d with said corrected instant melt surface level.

7. The apparatus according to claim 6, wherein said means for measuring said initial melt surface level comprises:

a pulse generator for outputting pulses proportional to rotatory displacement of a drum on which is wound a wire for pulling up said monocrystalline rod;

a sensor for detecting a seed crystal connected to one end of said wire when said wire passes a predetermined level, said sensor having an output;

a counter for counting said pulses from said pulse generator, said counter being reset by said detection signal from said sensor output;

a power supply for applying a voltage between said drum and said crucible; and means for detecting contact of said seed crystal with said melt by detecting variation of an electric current flowing between said drum and said crucible.

8. The apparatus according to claim 7, wherein said means for detecting contact of said seed crystal with said melt comprises:

connecting lines for conducting electrical current between said drum and said crucible through said power supply;

a resistor connected with said connecting line in series; and a comparator for comparing a voltage between both ends of said resistor and a reference voltage so as to detect the variation of electric current flowing between said drum and said crucible.

9. The apparatus according to claim 6, wherein said means for measuring said initial melt surface level comprises:

a means for applying a laser beam to said melt surface;

an image sensor receiving the laser beam reflected by said melt surface; and means for computing said initial melt surface level as a function of a position of a beam spot formed on said image sensor.

10. The apparatus according to claim 6, wherein said means for correcting said diameter "d" comprises multiplying said diameter "d" with a function of the difference between said corrected instant melt surface level and said initial melt surface level.

* * * * *